Feb. 21, 1933.   A. A. ANDRAKE   1,898,805
VALVE
Filed Sept. 16, 1927   2 Sheets-Sheet 2
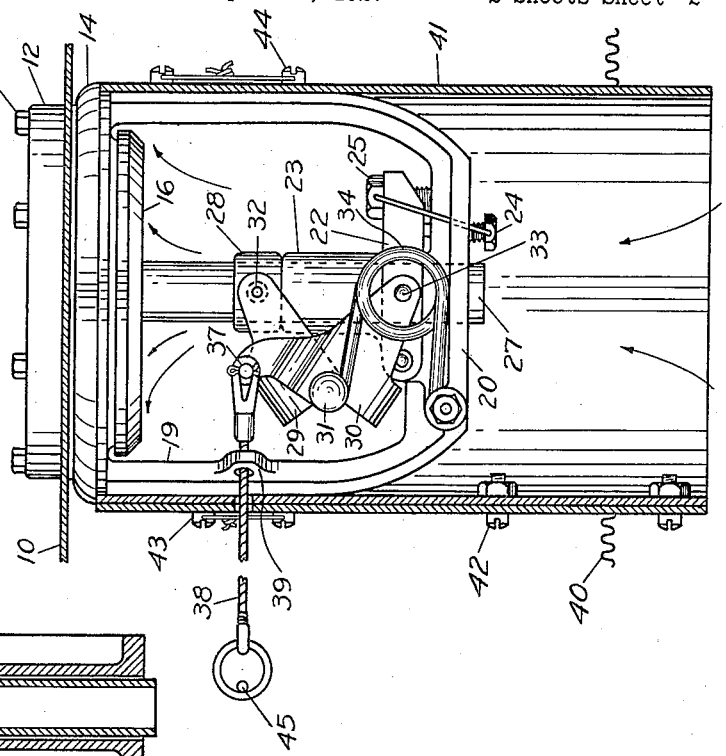
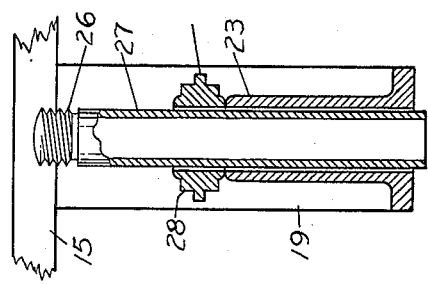
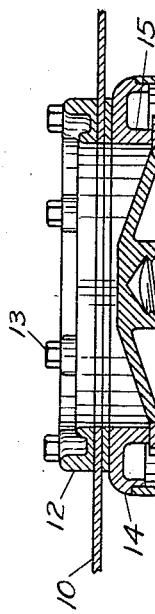
INVENTOR
Andrew A. Andrake
BY
W. B. Churcher
ATTORNEY Patented Feb. 21, 1933

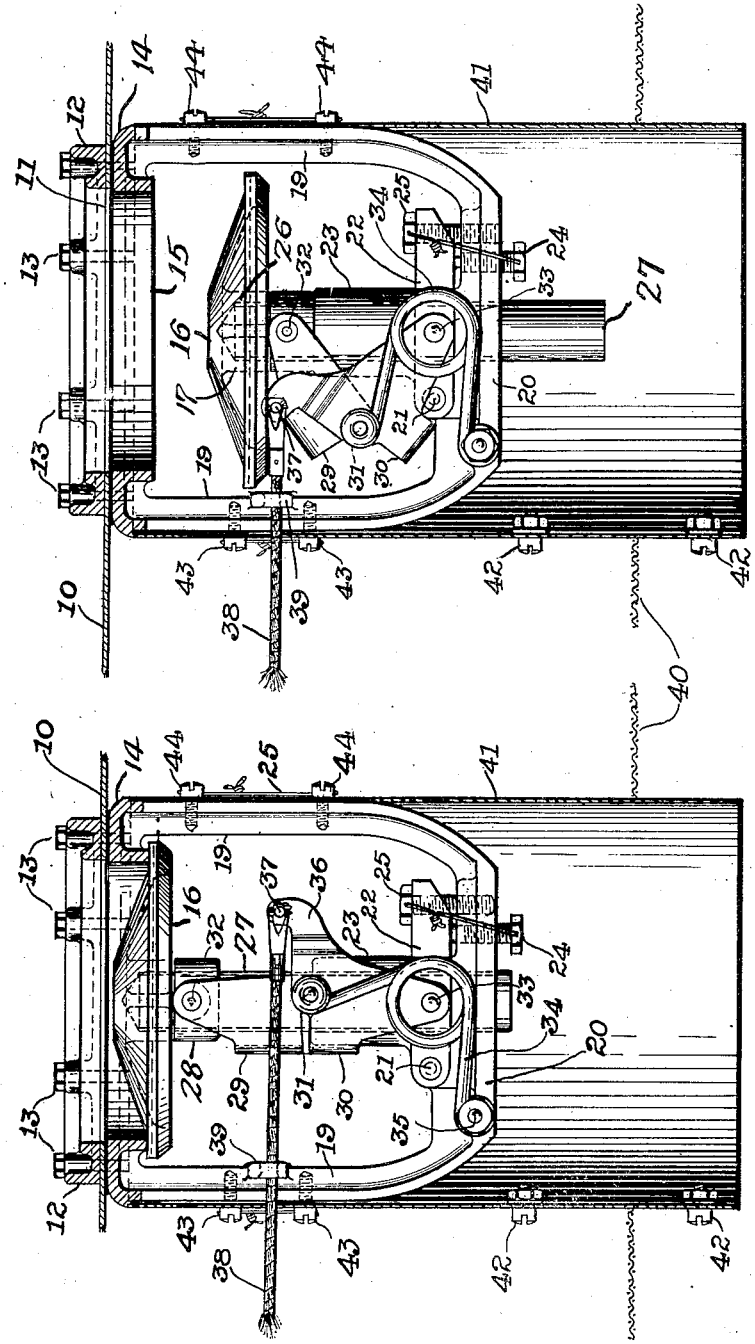

1,898,805

UNITED STATES PATENT OFFICE

ANDREW A. ANDRAKE, OF CLEVELAND, OHIO, ASSIGNOR TO THE GLENN L. MARTIN COMPANY, OF BALTIMORE, MARYLAND, A CORPORATION OF OHIO

VALVE

Application filed September 16, 1927. Serial No. 219,890.

This invention relates to improvements in fuel tanks for airplanes, and particularly to operating means for scuttle valves employed in connection with such tanks.

In the event of fire upon an airplane, or of a forced descent to the surface of the sea, it is highly desirable to be able to quickly evacuate the fuel tank. In the event of fire the discharge of fuel removes the danger of an explosion. In the event of a forced descent the descreased weight and the displacement provided by the empty fuel tank increases the buoyancy of the plane.

A primary object of the present invention, therefore, is the provision of means for quickly and easily opening a valve of ample size in the bottom of an airplane fuel tank.

Another object is to decrease the total weight of an airplane in advance of a forced landing.

Another object is the provision of a valve mechanism, in which the inherent buoyancy is increased when immersed in water, and in which provision is made against loss of the supplementary buoyancy.

Another object is the provision of means for directing the discharge of fuel away from inflammable parts of the plane when the scuttle valve is opened.

Another object is the provision of a valve of such nature as to remain tightly closed in the event that the tank is submerged, as in the case of a forced landing upon the water, whereby the buoyancy of the aircraft is increased.

Another object is the provision of means for confining an attempted inflow of fluid to a diameter substantially concentric with the valve head to thus close the valve and conserve the inherent buoyancy of the emptied tank.

Other objects and features of novelty will appear as I proceed with the description of that embodiment of the invention which, for the purposes of the present application, I have illustrated in the accompanying drawings, in which—

Fig. 1 is a view partially in elevation and partially in vertical section through the center of the scuttle opening of an airplane fuel tank, the valve and operating parts being shown in closed position;

Fig. 2 is a similar view with the valve and operating parts in open position; and Fig. 3 is a fragmental sectional view illustrating the valve stem and its guide, together with a valve control collar.

Fig. 4 is a view corresponding to Fig. 1 when turned 90° to show opposite sides of the cable controlled mechanism.

Fig. 5 is a view corresponding to Fig. 4 when the control cable has become fouled and the valve has closed by an attempted entrance of water in the direction of the arrows.

In the drawings the bottom wall of a liquid fuel tank for an airplane is illustrated at 10, having therein a scuttle opening 11. Surrounding this opening on the upper side within the tank is a reinforcing ring 12, in which are mounted a series of bolts 13 that extend downwardly through aligned openings in the tank wall 10, and in the upper annular portion of a valve frame 14. The annular portion mentioned has a down-turned flange 15 which forms the seat for a mushroom valve 16 having an attached boss 17 and a recess 18. On the upper side of the latter, near its rim, there is an annular socket in which I mount a packing to form the engaging surface of the valve to seat 15.

The frame 14 below its annular portion consists of a pair of diametrically opposite depending arms 19 joined at the bottom by a base 20. On the latter there is pivoted at 21 a valve stem guide 22 provided with an integral upstanding guide extension 23. An adjusting stud 24 is mounted in a threaded hole extending through the base 20 from below and bears upon the lower side of valve stem guide 22 for the purpose of regulating the height thereof within close limits. When properly adjusted, the guide 22 is held in position by a stud 25 which extends through an opening in the guide and into a threaded opening in the base. When these two studs are properly set their rotation is prevented by conventional means such as a wire threaded through drilled openings in the heads of the studs and having its ends twisted together.

The valve boss 17 is attached at 26 to valve stem 27. The valve stem normally slides in guide 22, in guide extension 23, and in an opening through base 20 aligned with the guides.

The movement of the valve is controlled by a collar 28 and pair of links 29 and 30 which are hinged together upon a pair of aligned pivots 31, these links being U-shaped in cross section at their adjacent ends. The outer ends of link 29 straddle the collar 28 and are pivotally connected thereto around the axis 32. Similarly, the outer ends of link 30 straddle the guide 22 and are pivotally connected thereto around the axis 33. The links are urged toward their extended position as shown in Fig. 1 by a wire spring 34 which is anchored at 35 to the base 20 and at its other end surrounds the pivot 31. Preferably, the spring 34 is duplicated on the opposite side of the structure.

From one side of the link 30 there extends laterally an integral arm 36 to which is pivotally connected at 37 a cable 38, by means of which the links may be moved against the action of spring 34 from the extended position as shown in Fig. 1 to the folded position as shown in Fig. 2. 39 is a drilled lug on one of the frame arms 19 which forms a guide for the cable. I obtain an advantage from the use of the arm 36 in that the height of the pivot point 37 remains more nearly constant than does the height of the pivot 31. Hence the cable remains nearly straight in passing the guide opening in lug 39.

In order to direct the liquid discharged from the valve downwardly and away from all inflammable portions of the airplane, some of which are indicated at 40, by way of example, I cover the valve frame with a metal shell 41 formed from a flat sheet which is rolled into a cylinder and has overlapping side edges held together by short bolts 42 and by screws 43 which serve also to assist in securing the shell to the valve frame. Similar screws 44 are employed for the latter purpose on the opposite side of the frame. The shell 41 may, of course, be of any length necessary to extend downwardly below the lowest portions of the plane.

The cable 38 passes through an opening in the shell 41 and may extend to any convenient position accessible to the pilot or other member of the crew of an airplane. When the need to empty the fuel tank arises, the cable is pulled, the links 29—30 folded and, because of the weight of fuel valve 16 lowers to a position which is limited by the upper end of guide extension 23. The cable is then restrained by the pilot as at 45 or fastened while the fuel is discharging, the opening 11 being large enough to insure a quick evacuation of the tank. Upon releasing the cable the spring 34 immediately moves the links 29—30 into the extended position of Fig. 1, causing the valve 16 to tightly engage its seat, and thereafter the tank is ready to be refilled.

In the event of failure to release cable 38 from fastening means 45; or of cable 38 becoming fouled subsequent to dumping the fuel; or failure of spring 34; and in the event of a forced landing upon water, valve head 16 will seat automatically in response to an attempted in-rush of water.

Having thus described my invention, I claim:

1. In an airplane, the combination of a fuel tank having an opening in the bottom thereof, an upwardly closable valve head adapted to normally close said opening from below said bottom, means for restraining said head to said opening, a shell surrounding said opening and adapted to confine the discharge therefrom to a path extending downwardly below the adjacent parts of the plane, and means extending outside of said shell for releasing said restraining means of said valve.

2. In an airplane, the combination of a fuel tank having an opening in the bottom thereof, a valve frame attached to said tank around the said opening, a dump valve mounted in said frame and normally urged into closing position with respect to said opening, a shell surrounding said frame and adapted to confine the fuel discharged to a path extending downwardly below the adjacent parts of the plane, and means comprising a cable extending outside of said frame and shell for releasing said valve.

3. In combination with the fuel tank of an airplane, a valve seat in the bottom of said tank, a valve adapted to move toward and away from said seat, a perpendicular stem for said valve, a concentric guide member in which the stem is adapted to slide, a control member for said valve, said member being mounted in concentric relation to said stem and in coaxial relation to said valve, a pair of links pivotally connected together, one of said links having its outer end mounted upon a pivot fixed with respect to the tank and the other having its outer end pivoted to said control member, resilient means tending to move the pivotal connection between the links towards the line connecting the outer pivotal points of the links, and means for moving the said pivotal connection away from said line.

4. In combination with a valve seat, a valve adapted to move toward and away from said seat, a stem for said valve, a guide and a collar in which the stem is adapted to slide, a pair of links pivotally connected together, one of said links having its outer end pivoted to a fixed part and the other having its outer end pivoted to said collar, resilient means tending to move the pivotal connection between the links towards the line connecting the outer pivot points of the links, and means for moving said pivotal connection away from said line.

5. In combination with a valve seat, a valve adapted to move toward and away from said seat, a stem for said valve, a guide in which the stem is adapted to slide, a control member for said valve, said member being mounted in concentric relation to said stem and in coaxial relation to said valve, a pair of links pivotally connected together, one of said links having its outer end pivoted to said guide and the other having its outer end pivoted to said control member, resilient means tending to move the pivotal connection between the links towards the line connecting the outer pivot points of the links, means for moving said pivotal connection away from said line, and means for adjusting said guide.

6. In combination with a valve seat, a valve adapted to move toward and away from said seat, a stem for said valve, a guide in which the stem is adapted to slide, a control member for said valve, said member being mounted in concentric relation to said stem and in coaxial relation to said valve, a pair of links pivotally connected together, one of said links having its outer end pivoted to a fixed part and the other having its outer end pivoted to said control member, resilient means tending to move the pivotal connection between the links towards the line connecting the outer pivot points of the links, and an operating arm projecting at an angle from one link such that it moves across the line connecting the outer pivot points of the two links as the latter move from one extreme position to the other.

7. In an airplane, the combination of a fuel tank having an opening in the bottom thereof, a valve for said opening, resilient means for holding said valve in closed position, manually operable means for releasing said valve, and means for confining the discharge of fuel from said tank to a path extending downwardly below the adjacent parts of the plane.

8. In an aircraft, the combination of a liquid tank having an opening in the bottom thereof, a dump valve movable upwardly to close said opening, means tending to hold said valve closed against weight of contained liquid, and means adapted to be manually operated for opening the valve in response to the weight of said liquid.

9. In an aircraft, the combination of a liquid tank having an opening in the bottom thereof, a valve movable upwardly to close said opening, rigid means for supporting said valve in closed position, resilient means tending to hold said rigid means in operative position, and manual means for moving said rigid means out of operative position against the action of said resilient means.

10. In an aircraft, the combination of a liquid tank having an opening in the bottom thereof and having a downwardly facing valve seat surrounding said opening, a valve movable upwardly onto said seat, a movable abutment standing normally beneath said valve adapted to take force tending to open the same, resilient means tending to hold said abutment in its operative position, and manually operable means for moving said abutment away from said operative position and opening said valve.

11. In an airplane, the combination of a fuel tank having an opening in the bottom portion; a vertically closable disc valve adapted to normally close said opening from below said bottom; a tubular stem open at the lower end and attached in closed relation to said disc valve; a guide for said stem; a pendant tube surrounding said opening and adapted to confine the inward passage of fluid to within a diameter substantially concentric with the diameter of said disc valve and said valve stem.

12. In an airplane, the combination of a fuel tank having an opening in the bottom portion; a vertically closable disc valve adapted to normally close said opening from below said bottom portion, the under surface of said valve having a recess adapted to increase the buoyancy of said valve when immersed in water; a pendant stem attached to said valve; a guide member for said stem adapted to maintain said valve in coaxial relation to said opening; a pendant tube surrounding said opening and adapted to direct a flow of water toward the recessed surface of said valve.

13. In an airplane, the combination of a fuel tank having an opening in the bottom portion; a vertically closable disc valve adapted to normally close said opening from below said bottom portion, the under surface of said valve having a recess adapted to increase the buoyancy of said valve when immersed in water; a pendant tubular stem open at its lower end and the upper end attached to said valve in closed relation to increase the buoyancy of said stem and said valve when immersed in water; and a guide member for said stem adapted to maintain said valve in coaxial relation to said opening.

14. In an airplane, the combination of a fuel tank having an opening in the bottom portion; a vertically closable disc valve adapted to normally close said opening from below said bottom portion, the under surface of said valve having a recess adapted to increase the buoyancy of said valve when immersed in water; a pendant tubular stem open at its lower end and its upper end attached to said valve in closed relation to increase the buoyancy of said stem and said valve when immersed in water; a guide member for said stem adapted to maintain said valve in coaxial relation to said opening; a pendant tube surrounding said opening and adapted to direct a flow of water toward the recessed surface of said valve and the open end of said stem.

In testimony whereof, I hereunto affix my signature.

ANDREW A. ANDRAKE.